UNITED STATES PATENT OFFICE

2,427,647

INSECTPROOF CONTAINER LAMINATE

Hans W. Vahlteich, Edgewater, N. J., assignor to The Best Foods, Inc., New York, N. Y., a corporation of New Jersey No Drawing. Application December 30, 1944, Serial No. 570,757

2 Claims. (Cl. 154—82)

This invention relates to containers and more particularly to containers which are substantially insect-proof.

An object of this invention is to protect edible products in containers from destruction by insects such as moths.

Foodstuffs are frequently distributed to consumers in newsboard containers having an outer paper wrapping. While these containers are admirably effective in preventing contamination of the foodstuffs under ordinary conditions, they are not insect-proof. Insects, especially moths in some stages of their development, bore through these containers to render the contents thereof unsuitable for consumer use.

In accordance with this invention, a container is provided which is substantially insect-proof. This container is particularly effective in preventing moths from entering the container and rendering the contents thereof unsuitable for consumer use. The container of this invention comprises an outer coating of dichlorodiphenyltrichloroethane (2,2-bis-(chlorophenyl)-1,1,1-trichloroethane). The coating may be applied in any convenient manner such as by impregnating or spraying. For example, the container may consist of newsboard with an outer covering of paper impregnated with the dichlorodiphenyltrichlorethane. The outer paper for this purpose may be dipped or sprayed in a solution of the dichlorodiphenyltrichloroethane dissolved in an organic solvent, such as petroleum ether or chloroform. Alternately, after packaging, the entire container may be dipped or sprayed with this solution of dichlorodiphenyltrichloroethane. Another covering for a container which is satisfactory is a laminated structure including a central layer having a coating of dichlorodiphenyltrichloroethane thereon and a layer immediately adjacent to each side of the central layer. The central layer may be of any suitable material such as paper, while the outer layers are of any desirable material which effectively retards the loss of dichlorodiphenyltrichloroethane by slow evaporation. The outer layers may be, for example, unimpregnated paper. The entire laminated structure, the layers of which may or may not be joined together by means of an adhesive, may be employed as a covering means for containers holding either cereal or other edible materials. Desirably, the laminated structure completely surrounds and encloses the container. In this manner the contents of the container are rendered substantially moth-proof, and substantially none of the dichlorodiphenyltrichloroethane penetrates into the package or evaporates into the air.

A more comprehensive understanding of this invention is obtained by reference to the following example.

*Example.*—A container is constructed by joining together newsboard in the conventional manner. After the container has been filled with the desired product, it is covered completely by a laminated structure consisting of a central sheet of paper impregnated with dichlorodiphenyltrichloroethane and an outer layer on each side of the central layer consisting of unimpregnated paper. The impregnated layer of paper is prepared by passing the paper through a solution containing 7 ounces of dichlorodiphenyltrichloroethane per gallon of chloroform. The outer layers of unimpregnated paper on each side of the impregnated layer may be joined to the central layer by any suitable means such as glue.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A covering for a container for food comprising a central layer having a coating of dichlorodiphenyltrichloroethane thereon and a layer immediately adjacent to each side of said central layer which retards the passage of dichlorodiphenyltrichloroethane by evaporation.

2. A covering for a container for food including a laminated structure comprising a central porous layer impregnated with dichlorodiphenyltrichloroethane and an outer layer immediately adjacent to each side of said central layer which retards the passage of dichlorodiphenyltrichloroethane by evaporation.

HANS W. VAHLTEICH.

REFERENCES CITED

The following references are of record in the file of this patent:

UNITED STATES PATENTS

| Number | Name | Date |
| --- | --- | --- |
| 2,329,074 | Muller | Sept. 7, 1943 |
| 1,092,059 | La Fore | Mar. 31, 1914 |
| 2,143,043 | Wexler | Jan. 10, 1939 |
| 2,129,659 | Easling | Sept. 13, 1938 |